(12) United States Patent
Fujieda (10) Patent No.: US 7,181,052 B2
(45) Date of Patent: Feb. 20, 2007

(54) FINGERPRINT IMAGE INPUT DEVICE AND LIVING BODY IDENTIFICATION METHOD USING FINGERPRINT IMAGE

(75) Inventor: Ichiro Fujieda, Tokyo (JP)

(73) Assignee: NEC Corporation, Tokyo (JP)

( * ) Notice: Subject to any disclaimer, the term of this patent is extended or adjusted under 35 U.S.C. 154(b) by 767 days.

(21) Appl. No.: 10/225,844

(22) Filed: Aug. 22, 2002

(65) Prior Publication Data

US 2003/0044051 A1 Mar. 6, 2003

(30) Foreign Application Priority Data

Aug. 31, 2001 (JP) ............................. 2001-264604

(51) Int. Cl.
*G06K 9/00* (2006.01)

(52) U.S. Cl. ................... 382/124; 340/5.83; 382/116; 382/278; 600/310

(58) Field of Classification Search ............... 382/124, 382/125, 218, 378; 340/5.81, 5.83; 600/309, 600/310

See application file for complete search history.

(56) References Cited

U.S. PATENT DOCUMENTS

| | | | | |
|---|---|---|---|---|
| 5,088,817 A | * | 2/1992 | Igaki et al. ................... 356/71 |
| 5,953,441 A | * | 9/1999 | Setlak ........................ 340/5.83 |
| 6,011,860 A | * | 1/2000 | Fujieda et al. .............. 382/126 |
| 6,131,464 A | * | 10/2000 | Pare et al. .................... 73/714 |
| 6,349,227 B1 | * | 2/2002 | Numada ..................... 600/310 |
| 6,647,133 B1 | * | 11/2003 | Morita et al. ............... 382/124 |
| 6,665,428 B1 | * | 12/2003 | Gozzini ...................... 382/124 |
| 6,687,521 B2 | * | 2/2004 | Sato et al. .................. 600/344 |
| 6,876,757 B2 | * | 4/2005 | Yau et al. ................... 382/125 |
| 6,888,956 B2 | * | 5/2005 | Muramatsu et al. ........ 382/124 |
| 6,895,104 B2 | * | 5/2005 | Wendt et al. ............... 382/125 |
| 7,084,415 B2 | * | 8/2006 | Iwai ........................... 250/556 |
| 2003/0044051 A1 | * | 3/2003 | Fujieda ....................... 382/124 |

FOREIGN PATENT DOCUMENTS

| | | |
|---|---|---|
| JP | 2708051 | 10/1997 |
| JP | 2774313 | 4/1998 |
| JP | 2000-20684 | 1/2000 |

\* cited by examiner

*Primary Examiner*—Gregory Desire
(74) *Attorney, Agent, or Firm*—Scully, Scott, Murphy & Presser, P.C.

(57) ABSTRACT

A color image sensor sequentially acquires a plurality of fingerprint images when a finger is pressed against the detector surface. A color information extraction unit detects the finger color in synchronization with the input of the plurality of fingerprint images. An areal information extraction unit detects a physical quantity representing the pressure applied by the finger to the color image sensor when the plurality of fingerprint images are acquired, particularly, the quantity related with the area of the finger in contact with the detector surface. A living body identification unit determines whether the finger is a live or dead one by the analysis of correlation between the physical quantity and the finger color. According to this configuration, even if the finger color does not change much, it is possible to distinguish living bodies from dead ones if there is a sufficient correlation with information such as the area of the fingerprint that reflects the finger pressure. The thickness of the fingerprint input unit is approximately 1–2 mm, determined by the sum of the thickness of the planar light source and that of the color image sensor.

13 Claims, 10 Drawing Sheets

FINGERPRINT IMAGE INPUT DEVICE AND LIVING BODY IDENTIFICATION METHOD USING FINGERPRINT IMAGE

BACKGROUND OF THE INVENTION

1. Field of the Invention

The invention relates to fingerprint image input devices and living body identification methods using fingerprint images. More specifically, the invention relates to a fingerprint image input device and a living body identification method using fingerprint images that determines whether the finger under scanning is a live or dead one based on the changes in the finger color that changes with the force applied to the finger.

2. Description of the Related Art

Conventionally, the fingerprint image input device has been used for fingerprint identification and user authentication for computer security and the like. For fingerprint identification, however, the fingerprint image input device is used to identify dead bodies as well as living bodies. Because some fingerprint devices do not distinguish between living bodies and dead ones, they allow an unauthorized access to computers, for example, if someone uses counterfeit goods (replicas) of another person's finger for identification. Thus if the fingerprint image input device can distinguish between living fingers and dead ones, it can prevent such unauthorized access to information systems, thereby ensuring ID security. Thus there has been a great need to develop such a living body identification method.

Figure 1:
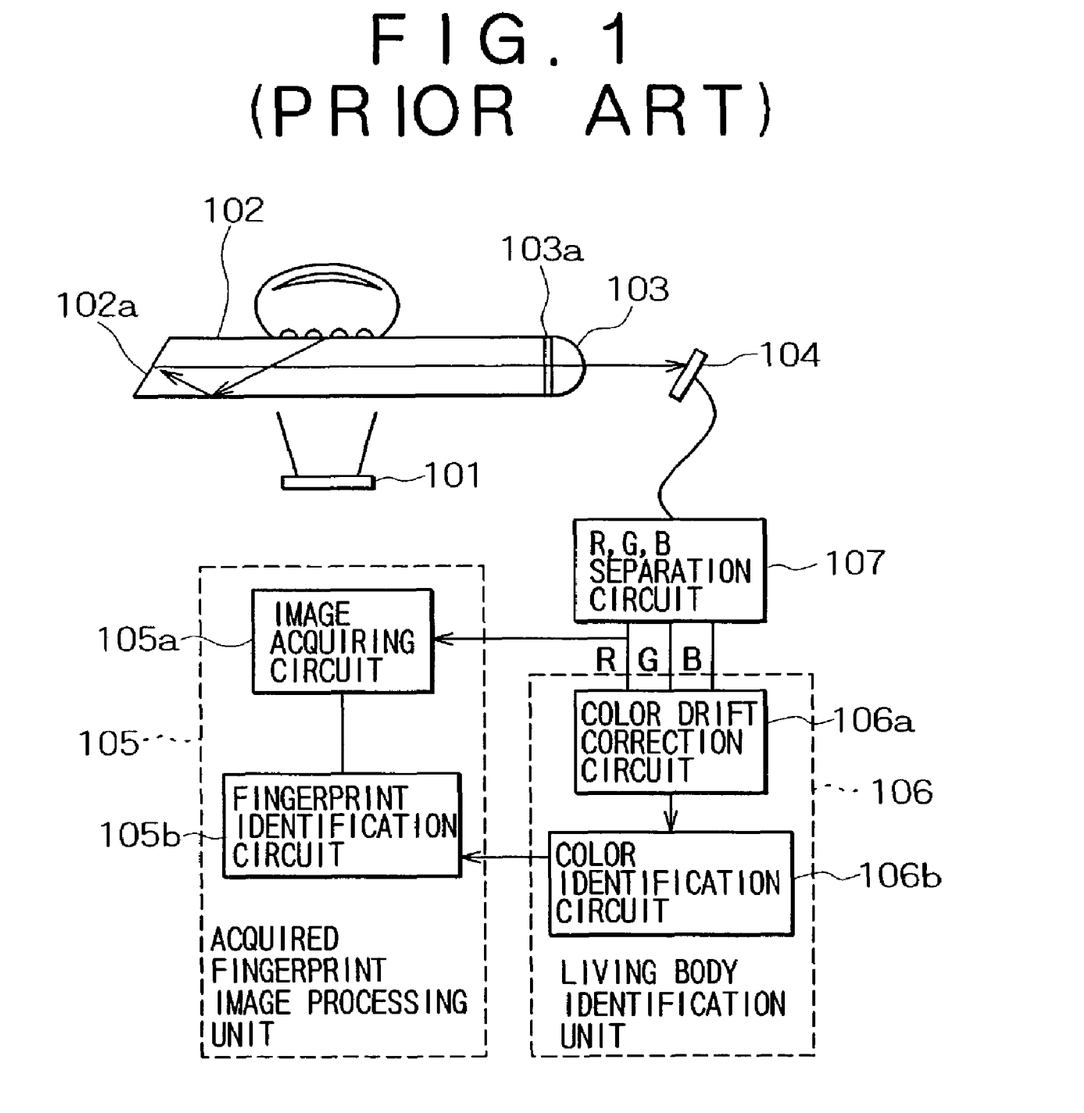
FIG. 1 is an explanatory diagram showing major constituent elements of a prior art fingerprint image input device.

Japanese Patent No. 2708051 (Japanese Patent Laid-Open Publication No. Hei. 3-087981) discloses a fingerprint image input device capable of distinguishing between living and dead bodies. FIG. 1 shows the major constituent elements of the device disclosed in this Japanese Patent No. 2708051. This fingerprint image input device includes a light source 101, a transparent unit 102, a mirror 102a, a lens 103, an aperture 103a, a color CCD 104, an acquired fingerprint image processor 105, an image acquiring circuit 105a, a fingerprint identification circuit 105b, a living body identification unit 106, a color drift correction circuit 106a, a color identification circuit 106b, and an R,G,B separation circuit 107.

Now described is the operation of this prior art fingerprint image input device. The light emitted from the light source 101 passes the transparent unit 102 and irradiates the finger. Part of the light scattered by the finger proceeds in the direction shown by the arrow in FIG. 1, reflects on the mirror 102a and reaches the aperture 103a. The light that has passed the aperture 103a is focused onto the color CCD 104 through the lens 103. The output signal from the color CCD 104 is separated into R,G,B three-color image information by the RGB separation circuit 107 and enters the living body identification unit 106. The living body identification unit 106 detects the changes in finger color resulting from an increase in the finger pressure and determines whether the finger is a living or dead one.

Specifically, this technique utilizes the light reflectivity that changes between the moment the finger has just touched the detector surface and the moment the finger is pressed against the detector surface. In fact, the light reflectivity of a human finger makes a considerable difference in the 450–600 nm wavelength range, depending on whether the finger is depressed or not. At the moment a finger has just touched the detector surface, the image of the fingerprint takes on a tinge of red, while it takes on a tinge of white when the finger is strongly pressed against the detector surface. The color drift correction circuit 106a and the color identification circuit 106b determine whether the finger is a live one or not based on the color difference in the fingerprint image resulting from different finger pressures. If the finger is determined to be a live one, the fingerprint identification circuit 105b in the acquired fingerprint image processor 105 compares its fingerprint image with that registered therein beforehand.

Another living body identification device is disclosed in Japanese Patent No. 2774313 (Japanese Patent Laid-Open Publication No. Hei. 2-307176). This living body identification device utilizes the changes in the color of the finger skin when the finger is pressed against a transparent unit. It determines whether the finger is a live or dead one based on the change in the reflectivity of light returned from the finger when irradiating light onto the finger through a transparent unit from a light source. Such a living body identification device is made thin by disposing the light source, photodetector, focusing device and wavelength selection device under the bottom face of the transparent unit opposite to its top face on which the finger is placed and disposing the light guide unit and light polarization unit further thereunder.

Another fingerprint image input device is disclosed in Japanese Patent Laid-Open Publication No. 2000-20684. It irradiates probe light and reference light from a live-scan light source onto the finger in contact with the detector surface. The detection unit outputs an electric signal corresponding to the intensity of the probe light that has passed inside the finger and another electric signal corresponding to the intensity of the reference light that has passed inside the finger. Then the living body identification unit determines whether the finger placed on the detector surface is a live or dead one based on the intensities of the probe and reference light represented by both electric signals provided by the through-light detection unit.

Those prior art fingerprint image input devices have the following disadvantages.

First, it is difficult to identify living bodies with high reliability. The prior devices determine whether the finger is a live or dead one based on the colors of the fingerprint images corresponding to strong and weak finger pressures. For fingerprint identification, however, some criteria become necessary. Although there are no specific criteria described in the aforementioned patent publication, in general, a finger is determined to be alive when the finger shows a color change larger than a predetermined threshold.

However, when the ambient temperature is low, the finger takes on a tinge of white before depression and thus the finger color does not change much. Also when the finger is lightly pressed against the detector, the change in color is small. In those cases, there is a concern that the obtained color change is smaller than the predetermined threshold and the device makes the wrong decision that the live finger is a dead one. In addition, the identification reliability is much dependent on how a fingerprint image is acquired during strong finger pressure.

In Japanese Patent No. 2708051 (Japanese Patent Laid-Open Publication No. Hei. 3-087981), there is a description "fingerprint image detected with stability by an image detection unit". However, no specific means for determining whether the image is stabilized or not is disclosed. Depending on the conditions of the finger placed on the detector surface, even a live finger may not bring about a color change large enough for identification. The prior art devices have such a disadvantage of poor capability of carrying out reliable living body identification.

Second, the prior art devices have another disadvantage of being difficult to downsize because they need focusing optic systems. Thus it is not easy to install them in mobile gears such as cell phones and personal digital assistants. The focusing optic system needs a lens, a transparent body, a mirror and other components for guiding light and producing images of little distortion. Thus such a focusing optical system becomes as thick as about the width of a finger. In the lateral direction, the lens must be away from the CCD at least 10 mm for focusing. As a result, it is impossible to install a prior art device in a small space, for example, 1 mm thick and 20 mm wide.

SUMMARY OF THE INVENTION

An object of the invention is to provide a fingerprint image input device and a living body identification method utilizing fingerprint images capable of identifying living bodies with high reliability and small enough to fit in mobile gears.

A fingerprint image input device according to the present invention comprises an image input unit that sequentially acquires a plurality of fingerprint images of a finger pressed against a detector surface, a color detection unit that detects a color of the finger in synchronization with the input of the plurality of fingerprint images, a pressure detection unit that detects a physical quantity reflecting a pressure applied by the finger to the detector surface when the plurality of fingerprint images are acquired, and a determination unit that determines whether the finger is a live or dead one by analyzing a correlation between the physical quantity and the color of the finger.

The color detection unit may include a circuit that calculates the average of colors of a specific area in the center of each of the plurality of fingerprint images.

The pressure detection unit may include a circuit that processes the fingerprint images and the physical quantity is a quantity related with the area of the finger in contact with the detector surface.

The pressure detection unit may be a pressure sensor located on a back or a periphery of the image input unit.

The image input unit may be a fingerprint image sensor formed on a transparent substrate and sensitive to capacitance or pressure and the fingerprint image sensor has a light source and a color sensor located on the back thereof.

The image input unit may have a prism having a face where the finger touches, a light source emitting light to the prism to irradiate the finger in a slanting direction and an optical system that focuses the light returned from the face in contact with the finger on an image sensor.

A fingerprint image input device according to another aspect of the present invention comprises a color image sensor that acquires color image data of the fingerprint of a finger in close contact with an image input surface, an image temporary storage unit that stores the fingerprint image data, an areal information extraction unit that extracts areal information of the fingerprint from the fingerprint image data, a color information extraction unit that extracts color information of the fingerprint, and a living body identification unit that determines whether the finger is a live or dead one by examining a correlation between the areal information and the color information and by referring to a predetermined threshold and a coefficient of correlation with the fingerprint area calculated for each of predetermined colors.

The above areal information extraction unit can extract the areal information of the fingerprint by a calculation extracting fingerprint ridges and valleys from the fingerprint image data and a calculation calculating an area of the ridge and valley regions of the fingerprint; and the color information extraction unit can conduct a calculation for selecting a specific area of the fingerprint, for example, the central area of the fingerprint and a calculation for calculating an average of each of red (R), green (G) and blue (B) in the specific area.

The fingerprint-based living body identification method according to the present invention comprises the steps of acquiring a color fingerprint image data of a finger in contact with an image input surface, storing the fingerprint image data in a temporary memory, extracting an areal information of the fingerprint from the fingerprint image data, extracting a color information of the fingerprint, and determining whether the finger is a live or dead one by examining correlation between the areal information and the color information and by referring to a predetermined threshold and a coefficient of correlation with the fingerprint area calculated for each of predetermined colors.

The above areal information extraction step can extract the areal information of the fingerprint by a calculation extracting fingerprint ridges and valleys from the fingerprint image data and a calculation calculating an area of the ridge and valley regions of the fingerprint; and the color information extraction step can conduct a calculation for selecting a specific area of the fingerprint, for example, the central area of the fingerprint and a calculation for calculating an average of each of red (R), green (G) and blue (B) in the specific area.

DETAILED DESCRIPTION OF THE PREFERRED EMBODIMENT

Now the preferred embodiments of the fingerprint image input device and fingerprint-based living body identification method of the invention will be described with reference to the accompanying drawings below in detail.

Figure 2:
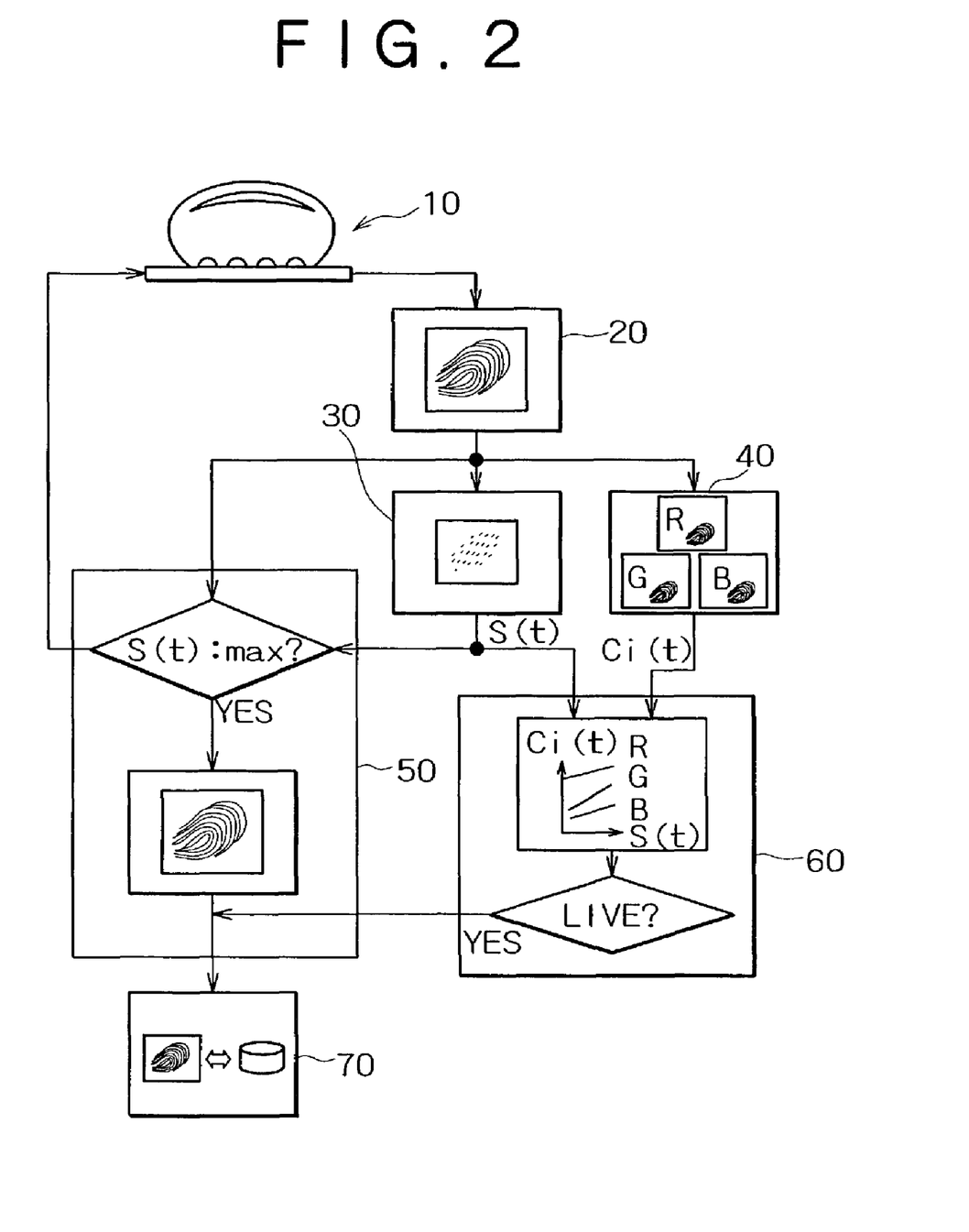
FIG. 2 is an explanatory diagram showing major constituent elements of a fingerprint image input device and fingerprint-based living body identification method according to a first embodiment of the present invention.

FIG. 2 shows the configuration of the fingerprint image input device in accordance with a first embodiment of the invention. This fingerprint image input device has a detector surface against which a finger is pressed and includes a color image sensor 10 that acquires the color image of the finger pressed against the detector surface, an image temporary storage unit 20 that temporarily stores the detection signal of the color image sensor 10, an areal information extraction unit 30 that extracts areal information from the output signal of the image temporary storage unit 20, a color information extraction unit 40 that extracts color information from the output signal of the image temporary storage unit 20, an image storage unit 50 that stores the output signal of the image temporary storage unit 20 to store images, a living body identification unit 60 that determines whether the finger is a live one or not based on the areal and color information sent from the areal information extraction unit 30 and color information extraction unit 40 respectively, and a fingerprint identification unit 70 that identifies the fingerprint based on the output signals from the image storage unit 50 and living body identification unit 60.

The color image sensor 10 acquires the color image of a finger when the finger is pressed against the detector surface (image input surface). Since no focusing optic system is needed in this configuration, the sensor can be made very thin. Configurations disclosed in the following Japanese patent publications may be also adopted as those for color image sensor 10.

First, as disclosed in Japanese Patent No. 2025659, a planar light source is coupled with a plurality of photodetectors arrayed on a transparent substrate at constant intervals to form a two-dimensional sensor unit. This planar light source has the same structure as that employed in the back light of liquid crystal displays. For example, in a configuration where light emitting diodes(LEDs) are arrayed at the end of a light guiding plate, the light guiding plate guides the light incident on the plate edge and diffuse the light, working as a planar light source. Alternatively, the planar light source can be made by sandwiching an electroluminescent (EL) material between two electrodes. The two-dimensional sensor unit formed on the transparent substrate consists of photodetectors such as photodiodes and photoconductors made of amorphous silicon (a-Si), for example, as the photosensitive material and of thin film transistors (TFTs) formed in the individual photodetectors for signal reading.

Second, as disclosed in Japanese Patent No. 3008859, the two-dimensional sensor unit has a plurality of photodetectors arrayed at constant intervals, and light emitting devices each of which is smaller than the photodetector are disposed between the individual photodetectors and the finger. Such a light emitting device consists of two electrodes sandwiching an EL material.

Third, as disclosed in Japanese Patent Application No. 2001-034571, a plurality of light emitting devices and photodetectors are two-dimensionally arrayed on a substrate to work as a display device as well as a light source, with the light intensity of each light emitting device being controlled.

The color image sensor 10 described above starts the output of fingerprint image data in response to an external control signal, continuously sends out the fingerprint image data at predetermined time intervals, and then halts the data output.

The image temporary storage unit 20 stores temporarily the fingerprint image data of a finger that is continuously transferred from the color image sensor 10. This storage unit 20 can be made of semiconductor memories such as DRAM and SRAM which can write/read data at high speeds. The fingerprint image data stored in the image temporary storage unit 20 is sent to the areal information extraction unit 30, color information extraction unit 40 and image storage unit 50.

The areal information extraction unit 30 includes a calculation circuit that extracts the areal information of fingerprint image. Specifically, for example, this is a calculation circuit for extracting the ridge and valley lines of fingerprint image and for calculating the area where the ridge and valley lines exist. Alternatively, it may be a calculation circuit that performs a two-level image processing with a simple threshold level (change the pixel value "1" for the pixel of which value is equal to or larger than the threshold, "0" for the pixel of which value is smaller than the threshold) and uses the number of such pixels as areal information. As described in detail later, a calculation circuit fitting to the characteristics of the color image sensor 10 should be chosen to extract the areal information. The areal information extraction unit 30 includes a circuit by which the fingerprint area of continuously acquired fingerprint images, $S(t)$, is sent to the image storage unit 50 and the living body identification unit 60.

The color information extraction unit 40 includes a calculation circuit that extracts the color information of a fingerprint. In particular, this is a circuit that chooses a specific area of a fingerprint, for example, the central area of the fingerprint, and calculates the average of each of red (R), green (G) and blue (B) colors in the specific area. Further, the color information extraction unit 40 includes a circuit that sends output $Ci(t)$ (i=R, G, B) or the average of each color (R, G, B) of the sequential fingerprint image data to the living body identification unit 60.

The image storage unit 50 includes a circuit that evaluates $S(t)$ or output of the areal information extraction unit 30 and a circuit that receives the fingerprint image data when the fingerprint area has reached a maximum and holds this data therein. It also has a circuit that sends a control signal to the color image sensor 10 for halting the image acquisition when the fingerprint area has reached a maximum. In addition, it has a circuit that sends the stored fingerprint image data to the fingerprint,identification unit 70 in response to the control signal from the living body identification unit 60.

The living body identification unit 60 includes a circuit that receives fingerprint area $S(t)$ sent from the areal information extraction unit 30 and average $Ci(t)$ (i=R, G, B) of each color in the sequential fingerprint images sent from the color information extraction unit 40 and then estimates the correlation between the color information and areal information. The living body identification unit 60 also includes a circuit that determines whether the finger is alive or dead based on a predetermined threshold and the correlation coefficient with respect to the area calculated for each color. Additionally, The living body identification unit 60 has a circuit that generates a control signal for sending the fingerprint image data held in the image storage unit 50 to the fingerprint identification unit 70 to start the calculation for fingerprint identification when the finger is determined to be alive.

The fingerprint identification unit 70 has a circuit that receives the fingerprint image data sent from the image storage unit 50, registers this fingerprint image data as the information of each individual and compares this image with the fingerprint images registered therein in advance.

Figure 14:
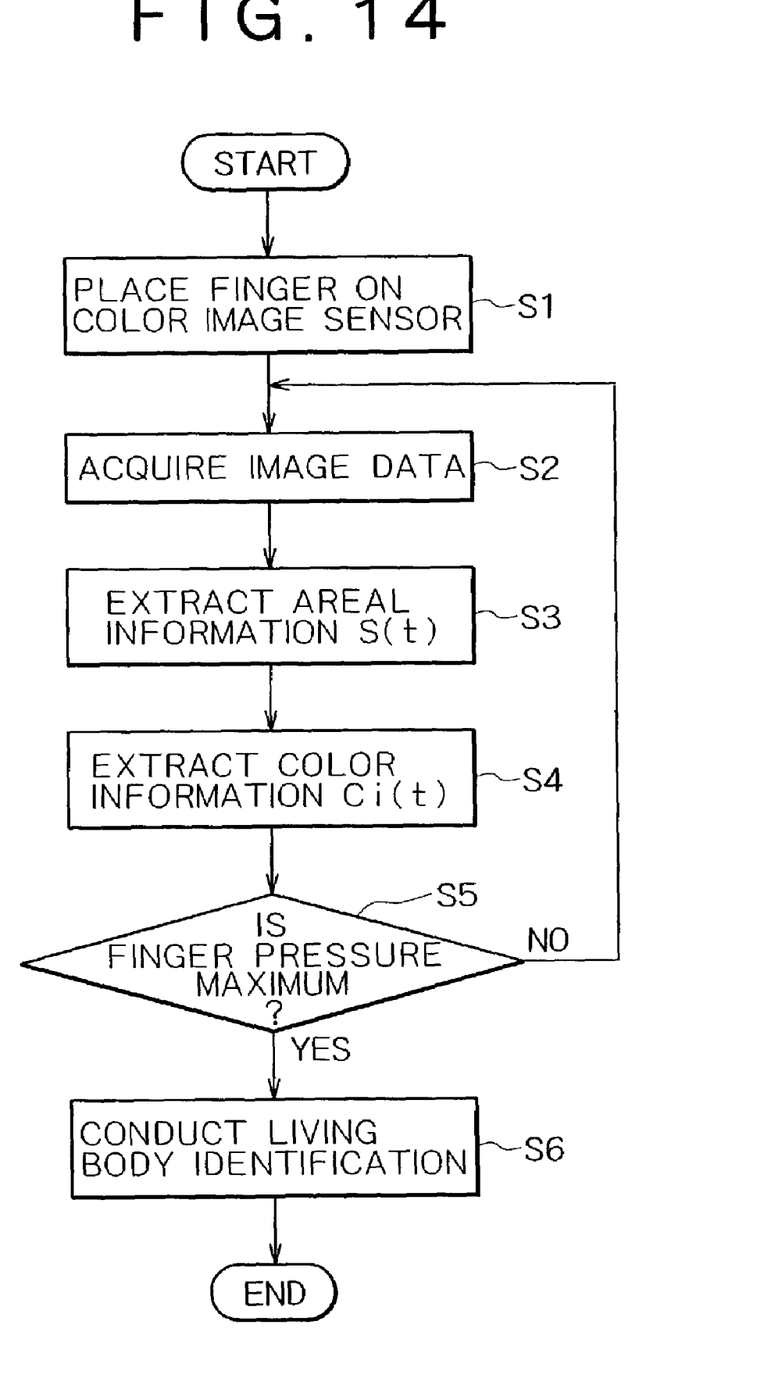
FIG. 14 is a flowchart illustrating an example of the device operation.

Next, with reference to FIGS. 2–6 and FIG. 14, how the fingerprint image input device and the fingerprint-based living body identification method according to the first embodiment work will be described. FIGS. 3–6 are explanatory diagrams illustrating the principle by which the living body identifying function of the fingerprint image input device and fingerprint-based living body identification method work according to the present embodiment. FIG. 14 is a flowchart illustrating an example of its operation.

First, as shown in FIG. 14, a finger is placed on the color image sensor 10 (step S1). The pressure applied to the color image sensor 10 is detected and then the image data of the finger is acquired (step S2). Areal information S(t) is extracted from the acquired image data (step S3), and color information Ci(t) is also extracted (step S4). The above steps, S2–S4, are repeated until the finger pressure becomes a maximum (step S5/NO). When the finger pressure is determined to have reached a maximum (step S5/YES), the, living body identification process is carried out (step S6). The above steps are described in further detail below.

Figure 3:
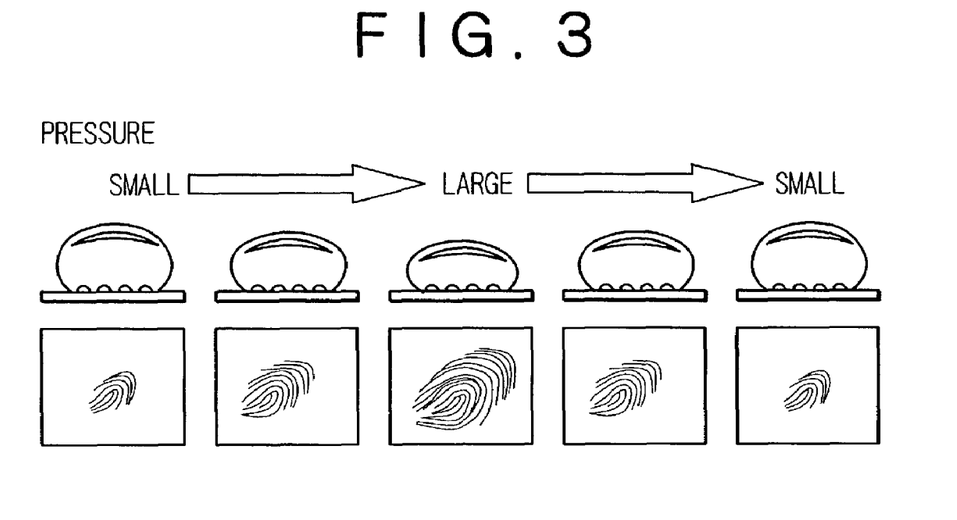
FIG. 3 is an explanatory diagram showing the principle behind the living body identification in the first embodiment of the invention.

FIG. 3 shows a series of finger motions seen from the moment a finger is placed on the color image sensor 10 to the moment the finger leaves the sensor. In FIG. 3, time goes by from the left to right. The fingerprint image acquired immediately after the touch of a finger is small in area. As the finger pressure grows, the area of fingerprint increases, and after it has reached a maximum the finger pressure decreases together with the fingerprint area. Finally, the finger leaves the sensor.

Figure 4:
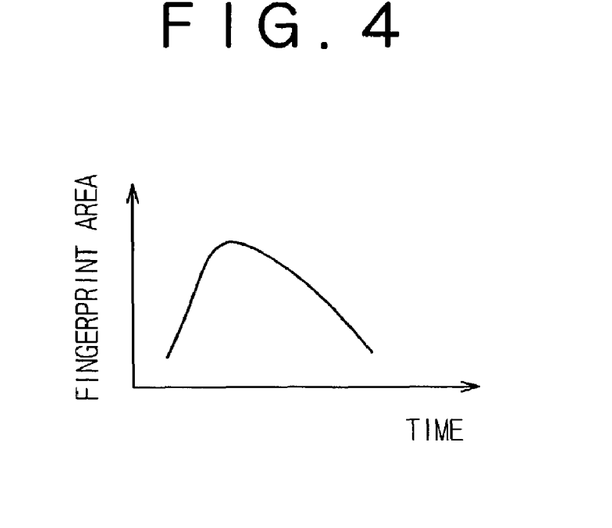
FIG. 4 is an explanatory diagram showing the principle behind the living body identification in the first embodiment of the invention.
Figure 5:
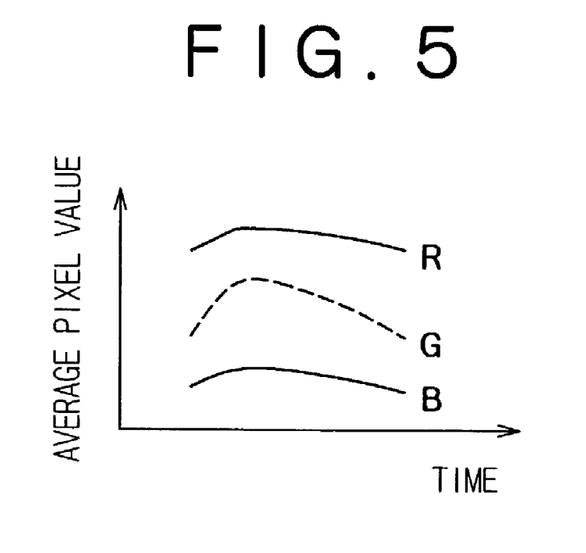
FIG. 5 is an explanatory diagram showing the principle behind the living body identification in the first embodiment of the invention.
Figure 6:
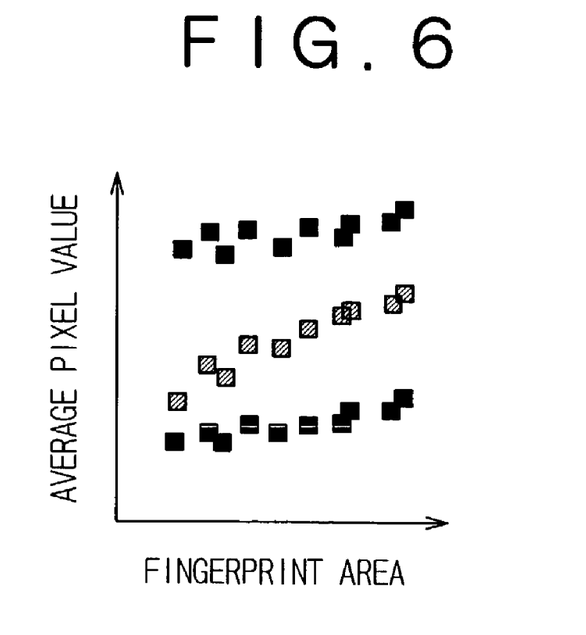
FIG. 6 is an explanatory diagram showing the principle behind the living body identification in the first embodiment of the invention.

FIG. 4 schematically illustrates how the area of a fingerprint changes during the above series of finger motions; this is the output from the areal information extraction unit 30, S(t). Meanwhile, FIG. 5 shows a schematic diagram illustrating change of the central area of a fingerprint in color; this is the output from the color information extraction unit 40, Ci(t) (i=R, G, B). FIG. 6 schematically illustrates the correlation between S(t) and Ci(t) provided by the living body identification unit 60. When there is a correlation stronger than a predetermined value, the living body identification unit 60 determines that the finger is alive. Then the fingerprint information is registered in the fingerprint identification unit 70 or compared with the fingerprint information registered in advance.

The following description will explain the steps from the fingerprint image input to living body identification with reference to some examples of actual numeric data and threshold settings. The color image sensor 10 includes a white light source, a two-dimensional image sensor equipped with a color filter for each of the R,G,B colors in all the pixels, and a fingerprint input surface (the surface the finger touches). This fingerprint input surface is an optical fiber plate that is a bunch of numerous fused fibers that have been cut with a thickness of 1 mm and polished. This two-dimensional image sensor outputs individual R,G,B images at a 256-level grayscale with 1024×768 pixels. The optical fiber plate is made of a bunch of optical-fibers (diameter 25 μm and numerical aperture 0.57) that are fused together with a light-absorption material filled therebetween.

APPLICATION EXAMPLE

The following is an example of a partially modified configuration of FIG. 2 for acquiring a series of finger motions seen from the moment the finger touches the sensor surface and the moment it leaves the sensor. In this configuration, a control signal for halting image acquisition is sent to the color image sensor 10 at the moment the finger has left the sensor surface, or the fingerprint area becomes "0" again, not the moment the area of the extracted fingerprint image becomes a maximum.

In this way, a series of fingerprint images obtained from the moment the finger has touched the sensor and to the moment it has left the sensor are acquired, and area signal S(t) and average color signal Ci(t) are extracted from the obtained fingerprint images. For producing area signal S(t), the respective fingerprint images of RGB colors are provided by averaging the pixel values of RGB and then converted the original images into two-level fingerprint images of gray-scale. Then the number of pixels of either level is used as the areal value. The threshold for this two-level conversion was set to "140." Meanwhile, Ci(t) or the average color signal was given by averaging the pixel value of each color in the central area(a 128×128 pixel area of the fingerprint whorls) of the fingerprint image.

Figure 7:
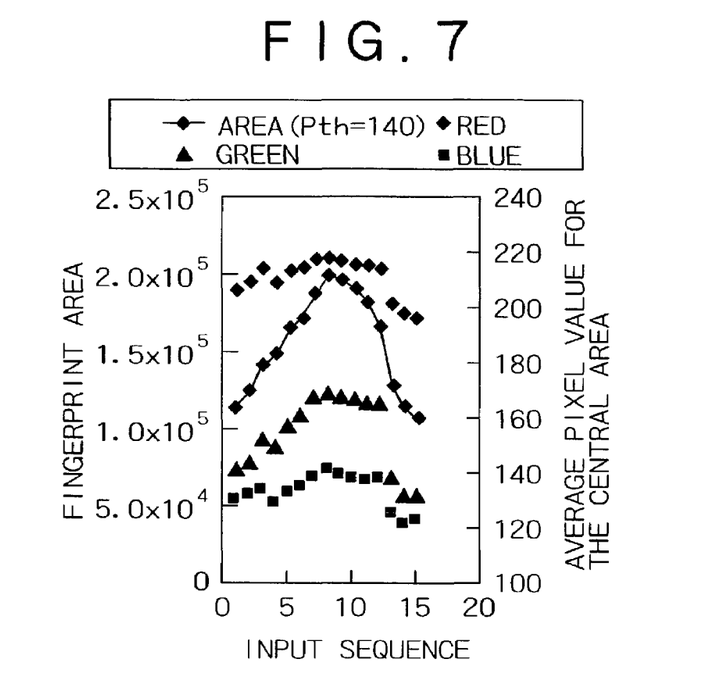
FIG. 7 is an explanatory diagram showing the changes in the area and color of fingerprint images produced in an application example of the first embodiment of the invention.

FIG. 7 shows area signals S(t) and average color signals Ci(t) calculated in the above manner. In FIG. 7, the lateral axis indicates the sequence number of acquired fingerprint images. The series of fingerprint images acquired between the moment the finger touched the sensor surface and the moment it left the sensor were given sequential numbers. The linked diamonds represent area signal S(t), with its scale shown on the left side. Specifically, in these 15 fingerprint images, S(t) increases from about $1.1 \times 10^{+5}$ to $2.0 \times 10^{+5}$ and then decreases. On the other hand, average color signal Ci(t) is represented by three markers with no line and its scale lies on the right side. The magnitudes of Ci(t) for R, G, B rank in this order, from most to least. It is also shown that Ci(t) changes along with S(t). Except for the fourth and thirteenth images where the color signal makes discontinuous changes, there is a positive correlation between Ci(t) and S(t).

Figure 8:
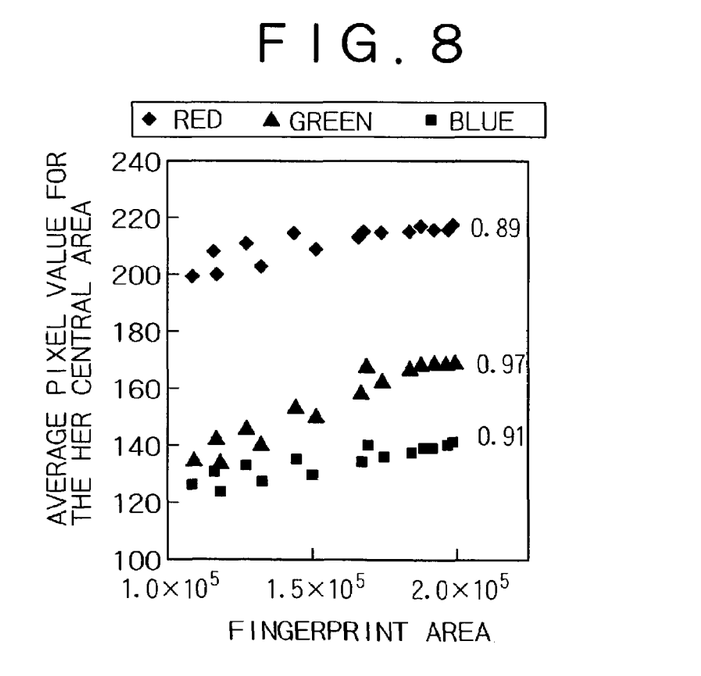
FIG. 8 is an explanatory diagram showing the correlations between the area and color of fingerprint images in an application example of the first embodiment of the invention.

FIG. 8 is a diagram that plots the data of FIG. 7 on a graph of which axes represent S(t) and Ci(t). FIG. 8 indicates that there are high correlations between the area and the pixel value in all colors. The figures in the graph are correlation coefficients between the average color signal and area signal for the three colors, calculated from the 15 images. The correlation coefficients for G,B,R rank in this order, from most to least. Although the color signal tends to fluctuate when the area is small, it comes to show strong correlation as the area grows. The area signals larger than a certain value show strong correlation with the color signal in all colors.

Based on the above results, we can set a criterion for determining whether the finger is a live or dead one. For example, such a criterion can be made that the finger is determined to be alive if the correlation coefficient between the G color signal and the area is 0.9 or larger. Alternatively, we can make a criterion that the ranking of correlation coefficient with the area, from highest to lowest, is G, B, R; or a criterion that the ranking of correlation coefficient with the area, from highest to lowest, is G, B, R and at the same time the correlation coefficient of the G signal is 0.9 or higher. Various criteria may be set in this way. When the criterion becomes stringent, misidentification is likely to occur but the security level becomes higher. In the above examples of criteria, the third one is the most stringent.

To what extent misidentification is allowed and to what level fingerprint security should be raised depend on the uses to which the fingerprint sensor is put. For instance, browsing homepages in the Internet using a home computer does not require high levels of security but the margin of misidentification will be small. Meanwhile, when one issues a certificate with an unattended terminal in a public site, for instance, a local office, the situation goes reverse. Namely, local offices require rather stringent criteria for living body identification. In this way,, an appropriate criterion should be chosen according to each use of the fingerprint sensor. The way of choosing a criterion is similar to that for choosing a criterion for fingerprint identification.

It should be noted that the characteristics shown in FIGS. 7 and 8 change greatly with the characteristics of the color image sensor, 10. Since the curves in FIG. 7 considerably depend on the characteristics of the employed color image sensor, the criterion for determining whether the finger is a live or dead one should be established on the basis of the correlations obtained in FIG. 8. This point will be explained in a second embodiment with reference to a few specific examples.

In summary, according to the present invention, the areal and color information is extracted from a plurality of images sequentially acquired since the finger is placed on the sensor surface, and the correlation between the areal information and the color information is used for determining whether the finger is a live or dead one. Thus compared with the prior art fingerprint image input device that distinguishes between a live finger and a dead one based on the colors of two fingerprint images acquired when the finger pressure is strong and when weak, the living body identification can be performed at higher reliability in the invention. In the prior art device, because it is not clear how to determine when the finger pressure is large, there is a concern that the reliability of identification may deteriorate due to the instability of input images. This invention has solved this problem by utilizing the areal information. The thickness of the fingerprint input unit of the invention is determined by the sum of the thickness of the planar light source and that of the color image sensor, for example, and it is approximately 1–2 mm. Compared with the prior art device, which is as thick as a finger, the device of the present invention is much thin. This will be a great advantage when the device is installed in mobile gears and the like.

Next, there will be described a second embodiment of the present invention. In the above first embodiment of the invention, the configuration of FIG. 2 is used in the unit for examining the correlation between the areal information and color information extracted from a series of fingerprint images. However, the circuit for implementing this function is not limited to the above example. For instance, this function can be realized by such a circuit that stores a series of fingerprint images in a large-capacity storage circuit and takes out this image information from the storage circuit during the steps of extracting areal and color information and conducting fingerprint identification. In addition, all or part of the constituent elements except for the color image sensor 10 of FIG. 2 may be replaced with a central processing unit (CPU) and memory such as used in personal computers in order to implement the same functions. Thus such configurations are included in the variations of the present invention.

Next, there will be described a third embodiment of the present invention. Also in the first embodiment of the invention, a series of fingerprint images have been acquired between the moment a finger has touched the sensor surface and the moment the fingerprint area shows a maximum or between the moment a finger has touched the sensor surface and the moment the finger has left the sensor surface. However, there are other ways of acquiring a series of fingerprint images. The living body identification based on the correlation between the areal information and color information can be performed with a configuration using either of the finger pressure increasing or decreasing process. Alternatively, the correlation information can be obtained by extracting similar information from a series of fingerprint images acquired through a process that a finger is pressed against the sensor more than one time. In this case, because of the advantage that the sensor user is allowed to adjust the finger pressure applied to the sensor and to place the center of the finger exactly on the sensor surface, clear images of the fingerprint can be acquired with high stability. Such configurations belong to the variations of the present invention.

Figure 9:
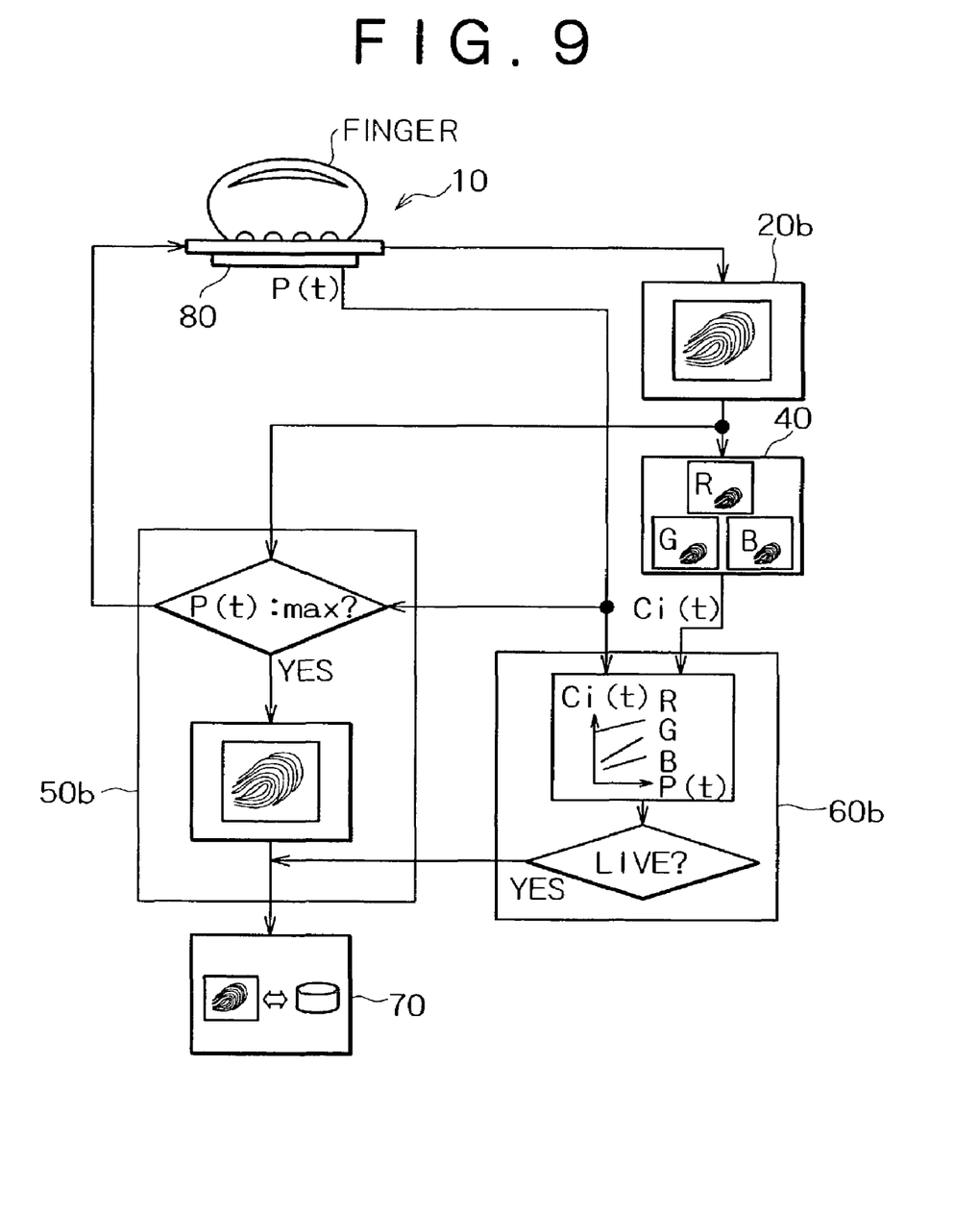
FIG. 9 is an explanatory diagram showing a fourth embodiment of the present invention.

Next, there will be described a fourth embodiment of the present invention. Although in the above embodiment the areal information has been extracted from fingerprint images, the finger pressure can be directly detected on behalf of the area. FIG. 9 shows the fourth embodiment of such a configuration. This fingerprint image input device includes a color image sensor 10, an image temporary storage unit 20b, a color information extraction unit 40, an image storage unit 50b, a living body identification unit 60b, a fingerprint identification unit 70 and a pressure sensor 80.

The constituent elements of the same functions have the same numerals in FIG. 9 and FIG. 2. What is featured in FIG. 9 is the pressure sensor 80 installed on the back of the color image sensor 10. The back of the pressure sensor 80 is fixed on a member (not shown, for example, part of the device chassis) and outputs a signal, P(t), which is proportional to the pressure applied to the color image sensor 10. Signal P(t) works like area signal S(t) of FIG. 2 and is sent to the living body identification unit 60b and the image storage unit 50b in FIG. 9. The living body identification unit 60b examines the correlation between signal P(t) and average color signal Ci(t). The other operations are the same as those in the configuration of FIG. 2, and the living body identification can be performed with reliability as high as that obtained by the configuration of FIG. 2. On the other hand, the image input unit of this device becomes thicker than the color image sensor of FIG. 2 as much as the thickness of the pressure sensor 80, being at least 1–2 mm and a little larger than that of FIG. 2. In addition, compared with the configuration of FIG. 2, this configuration has a disadvantage of increasing the number of necessary members since the pressure sensor has been added.

Figure 10:
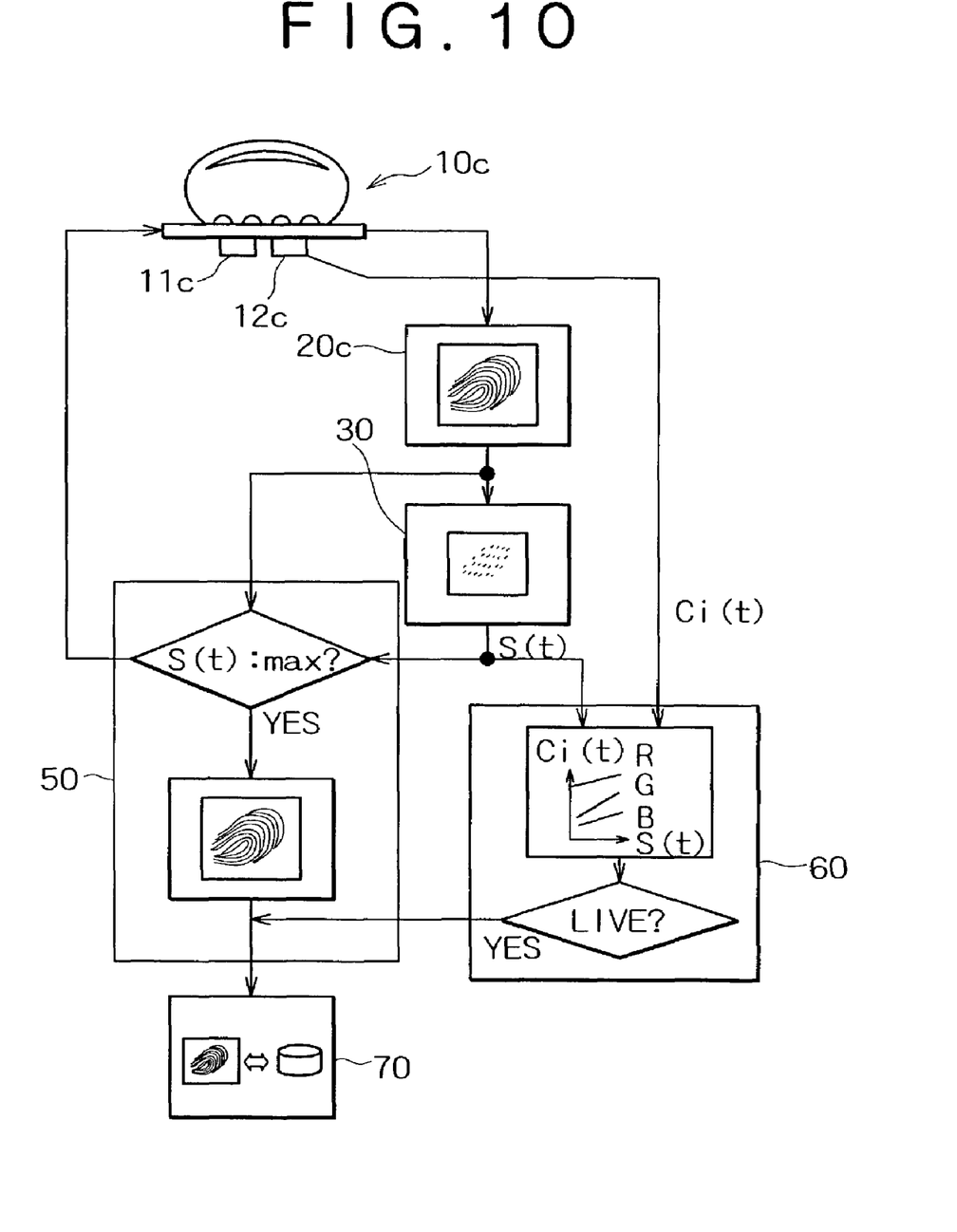
FIG. 10 is an explanatory diagram showing a fifth embodiment of the present invention.

Next, there will be described a fifth embodiment of the present invention. In another variation, a color sensor dedicated in extracting the color information may be installed. FIG. 10 shows the fifth embodiment of such a configuration. This fingerprint image input device includes a fingerprint image sensor 10c, a light source 11c, a color sensor 12c, an image temporary storage unit 20c, an areal information extraction unit 30, an image storage unit 50, a living body identification unit 60 and a fingerprint identification unit 70.

The constituent elements of the same functions have the same numerals in FIG. 10 and FIG. 2. What is featured in FIG. 10 is the light source 11c and the color sensor 12c installed on the back of the fingerprint image sensor 10c. This fingerprint image sensor 10c, formed on a transparent substrate, needs to pass part of the light incident onto the back of the transparent substrate, but does not, need to be a color image sensor. For example, it can be a monochrome optical image sensor, or a capacitance-sensitive fingerprint image sensor formed on the transparent substrate, such as disclosed in Japanese Patent No. 2959532.

The details of the capacitance-sensitive sensor is disclosed in the above Japanese patent publication. In principle, the concave/convex information of a finger surface is acquired as an image by detecting the capacitance built between the finger surface and electrodes installed in the pixels. Alternatively, the fingerprint image sensor 10c may be a fingerprint image sensor that is formed on a transparent substrate and detects pressure distribution. This relies on the following operation principle. Two-dimensionally arrayed pixel electrodes and a film of which resistance changes with pressure are layered on a switching device. The local pressure distribution resulting from a finger contact, or concave/convex information of the finger surface, or fingerprint image, is acquired by detecting the current flowing into the individual pixel electrodes.

A film of which resistance changes with pressure and pixel electrodes formed on a transparent substrate can be used as the fingerprint image sensor 10c for the configuration shown in FIG. 10. As the light source 11c, white light emitting diodes are recommended. As the color sensor 12c, a photodiode, for example, that has sensitivity peaks in R, G and B wavelengths are recommended. These devices are arrayed so that the light from the light source 11c may pass the fingerprint image sensor 10c to irradiate the center of the finger and the light scattered by the finger may be detected by the color sensor 12c.

Output Ci(t) from the color sensor 12c is sent to the living body identification unit 60 for examining the correlation with area signal S(t) as is the case with FIG. 2. The following operations are similar to those shown in FIG. 2, and the living body identification can be carried out with high reliability. However, according to the configuration of FIG. 10, compared with that of FIG. 2, the light source 11c and the color sensor 12c make the device thicker by at least approximately 1 mm, leading to a disadvantage in terms of compactness. In addition, this configuration is inferior to that of FIG. 2 because the number of constituting members increases.

In the configuration of FIG. 2, because the fingerprint image input unit consists of only the color image sensor 10, it is outwardly indistinguishable from a fingerprint input sensor having no function of identifying living bodies. Thus it is possible to improve security levels without increasing the number of constituting members, and it is difficult to understand the principle of living body identification even if the device is disassembled for reverse engineering. The configurations shown in FIG. 9 and FIG. 10 that need a pressure sensor and a color sensor, respectively, do not have such an advantage in terms of device security. Those configurations, however, rely on the principle of the invention that the living body identification is performed with reference to the correlation between the color information and areal information of fingerprint images. Thus the configurations shown in FIG. 9 and FIG. 10 are included in the variations of the present invention.

In the examples described above, a white light source and a color sensor have been used to acquire the color information of a fingerprint. However, the same function is realized by a configuration that detects the color information by switching the wavelength of the light source from time to time using a light source emitting light of different wavelengths and an image sensor or a photodetector sensitive to a single waveband. In this way, a variety of constituent elements can be used and replaced by others without departing from the scope of the invention.

In the first embodiment of the invention, the color and areal information has been extracted from the fingerprint images acquired by a thin color image sensor. This can meet two major objects of the invention, namely, improvement of the reliability of live body identification and significant downsizing of the device. If there is not a strong need for downsizing and the device is small enough to fit in hardware such as a mouse and a keyboard, a variety of other fingerprint image sensors can be used. Now described below is a sixth embodiment using a prior art optical fingerprint image sensor equipped with a prism.

Figure 11:
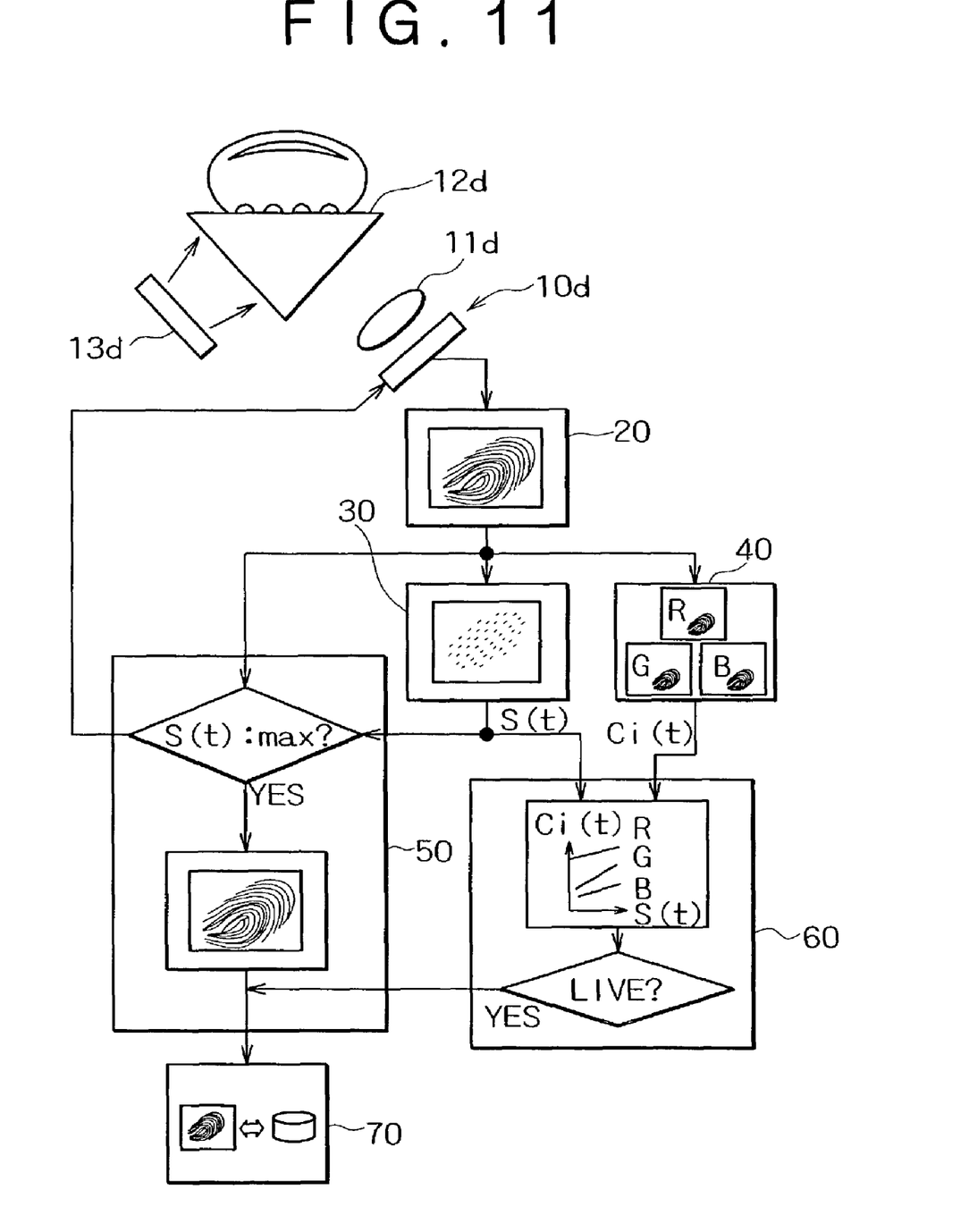
FIG. 11 is an explanatory diagram showing major constituent elements according to a sixth embodiment of the present invention.

FIG. 11 is a diagram illustrating the configuration of a sixth embodiment of the present invention. This fingerprint image input device includes a color image sensor 10d, a focusing optical system 11d, a prism 12d, a light source 13d, an image temporary storage unit 20, an areal information extraction unit 30, a color information extracting unit 40, an image storage unit 50, a living body identification unit 60 and a fingerprint identification unit 70.

The constituent elements of the same functions have the same numerals in FIG. 2 and FIG. 11. What is featured in FIG. 11 is that the color fingerprint image acquiring unit uses the color image sensor 10d, the focusing optical system 11d, the prism 12d and the light source 13d. Specifically, the color image sensor 10d may be a color CCD, the focusing optical system lid may be a lens, and the light source 13d may be a white light emitting diode.

In this configuration that takes advantage of the total internal reflection of light, high contrast fingerprint images are provided. Now the reason why the image contrast is enhanced is briefly described below. As shown in FIG. 11, the light emitted from the light source 13d irradiates the finger placed on the prism 12d. Since the valleys of a fingerprint do not contact the prism 12d, the light is totally reflected on the top surface of the prism 12d and almost all the light reaches the color image sensor 10d via the focusing optical system 11d. On the other hand, because the ridges of a fingerprint scatter the light incident on the finger, the intensity of light that reaches the color image sensor 10d becomes low. Thus the contrast between the valleys and the ridges of a fingerprint is enhanced, and the subsequent fingerprint image processing may become easier to conduct.

Figure 12:
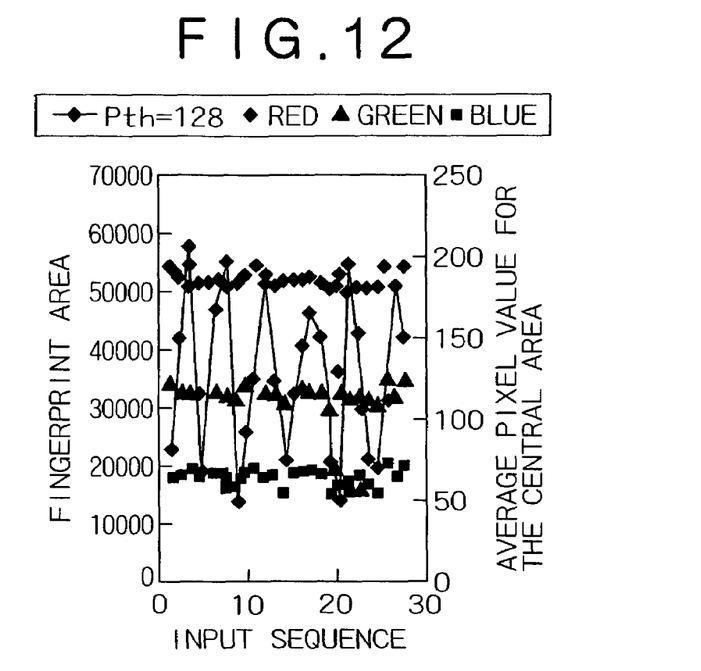
FIG. 12 is an explanatory diagram showing the changes in the area and color of fingerprint images in the sixth embodiment of the invention.
Figure 13:
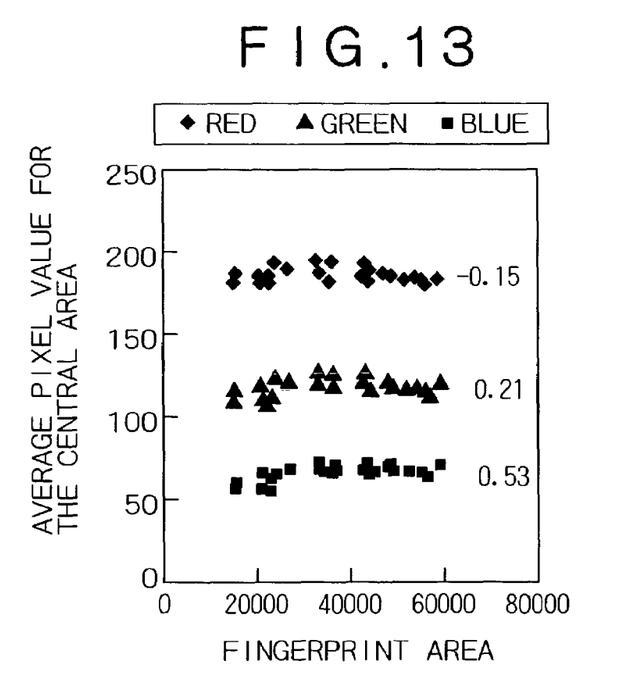
FIG. 13 is an explanatory diagram showing the correlation between the area and color of fingerprint images in the sixth embodiment of the invention.

FIG. 12 and FIG. 13 show the correlation between the areal information and the color information extracted from a series of fingerprint images, as is the case with FIG. 2. When extracting the areal information, the threshold was set to "128" for converting the fingerprint images into two-level images, and area signal S(t) was set to the number of pixels of which pixel value was 1. The extraction of the color information was the same as that in FIG. 2.

In FIG. 12, the lateral axis represents the sequential number of fingerprint images. The images acquired when a finger was tapped on the sensor surface several times were given sequential numbers. The linked diamonds represent area signal S(t) of which scale is shown on the left side. The series of 26 fingerprint images indicate that the finger was pressed against the sensor surface six times. Three markers with no line represent average color signal Ci(t) of which scale is shown on the right side. FIG. 13 is a diagram that plots the data of FIG. 12 on a graph of which axes represent S(t) and Ci(t). The figures in the graph are correlation coefficients between the average color signal and area signal for the three colors, calculated for the 26 images. The correlation coefficient for blue (B) is the largest. There is no correlation with the area for red (R). The correlation for green (G) lies between those for blue and red. The color signal tends to fluctuate when the area is small. Although the correlations for B and G are smaller than those in FIG. 2, it is possible to determine from the correlation coefficients whether the finger is a live or dead one by setting a low threshold, except for the case of R.

The difference in the optical system for acquiring a fingerprint is the cause of the marked difference in correlation between FIGS. 12–13 and FIG. 8. In the optical system of FIG. 11 that takes advantage of total internal reflection to enhance contrast, most of the light that reaches the color image sensor comes from the valleys of the fingerprint, and the portion of light coming from the ridges is relatively small. Since the scattering by the ridges produces the color information of the finger, the correlation coefficient may become small or near zero as the case of R. On the other hand, in the case of the optical system of FIG. 2, the light scattered by both valleys and ridges of a fingerprint is detected. Thus the changes in color due to changes in finger pressure are exactly detected. As these examples show, it is important to select criteria each suitable for the type of the employed optical system for acquiring fingerprint images.

The above embodiment has the following advantages over the prior art device that determines whether the finger is a live or dead one based on the finger color changes between immediately after the finger has touched the detector surface and when the finger pressure is large.

First, in the case of the prior art device, the living body identification cannot be performed with high reliability when the finger color does not change much. Either it is not clear how to acquire the fingerprint image when the finger pressure is high. Thus even a living finger may not produce a color change large enough for the right identification, affected by minor factors associated with the motion of the finger in contact with the detector surface. In the configuration of the invention, however, the areal and color information is extracted from a plurality of fingerprint images that are sequentially acquired since the finger has touched the detector surface, and the living body identification is carried out based on the correlation between the areal information and color information. Thus, even if the change of finger color is small, the live finger is identified as a living body if there is a sufficient correlation with the information like the area of the fingerprint that reflects the finger pressure. In the prior art device, it is not clear how to acquire a fingerprint image when the finger pressure is high, and thus there is a concern that the identification reliability may deteriorate due to the instability of input images. The present invention, however, has solved this problem by utilizing the areal information. As a result, the present invention allows us to carry out living body identification with high reliability, compared with the prior art device.

Second, the thickness of the fingerprint input unit of the present invention is approximately 1–2 mm, determined by the sum of the thickness of the planar light source and that of the color image sensor. It is significantly thin, compared with the prior art device that is as thick as a finger. This downsizing effect works as a great advantage when the fingerprint image input device or the fingerprint-based living body identification method is installed in mobile gears such as cell phones and portable information terminals.

Third, in the configuration shown in FIG. 2 of the first embodiment, only necessary image data is sent from the image temporary storage unit to the image storage unit. Thus it is not necessary to store all the fingerprint images. As a result, it is possible to prevent the growth of circuit scale for analyzing the series of fingerprint images and to prevent a rise in manufacturing cost.

While the present invention has been described in some preferred embodiments, it will be apparent to those skilled in the art that the disclosed invention may be modified in numerous ways and may assume many embodiments within the scope of the invention.

As described so far, the fingerprint image input device and fingerprint-based living body identification method of the invention acquire a plurality of fingerprint images by depressing a finger onto the detector surface and detecting the finger color in synchronization with the acquisition of fingerprint images as well as detecting a physical quantity reflecting the pressure applied to the finger during the input of the plurality of fingerprint images. This invention determines whether the finger is a live or dead one by analyzing the correlation between the physical quantity and the finger color. Thus even if the finger color does not change much, it becomes possible to conduct living body identification if there is a sufficient correlation with the information reflecting the finger pressure, such as the area of the fingerprint.

What is claimed is:

1. A fingerprint image input device comprising:
    an image input unit for sequentially acquiring a plurality of fingerprint images of a finger pressed against a detector surface;
    a color detection unit comprising a circuit for calculating an average of colors extracted from a specific area in a center of each of said plurality of fingerprint images, said color detection unit for detecting a color of said finger from said average of colors of said plurality of fingerprint images, a pressure measurement unit for detecting a physical quantity reflecting a pressure applied by said finger to said detector surface when said plurality of fingerprint images are acquired; and
    a determination unit for determining whether said finger is a live or dead one by analyzing a correlation between said physical quantity and the color of said finger.

2. The fingerprint image input device according to claim 1, wherein said pressure detection unit comprises a circuit for processing said fingerprint image data and said physical quantity is a quantity related with an area of said finger in contact with the detector surface.

3. The fingerprint image input device according to claim 1, wherein said pressure detection unit is a pressure sensor located on a back or a periphery of said image input unit.

4. The fingerprint image input device according to claim 1, wherein said image input unit is a fingerprint image sensor formed on a transparent substrate and sensitive to capacitance or pressure and said fingerprint image sensor has a light source and a color sensor located on the back thereof.

5. The fingerprint image input device according to claim 1, wherein said image input unit has a prism having a face where said finger touches, a light source emitting light to said prism to irradiate said finger in a slanting direction and an optical system for focusing light returned from the face in contact with said finger on an image sensor.

6. A fingerprint image input device comprising:
- a color image sensor for acquiring color image data of a fingerprint of a finger in close contact with an image input surface;
- an image temporary storage unit for storing said fingerprint image data;
- an areal information extraction unit for extracting areal information of said fingerprint from said fingerprint image data;
- a color information extraction unit for extracting color information of said fingerprint; and
- living body identification unit for determining whether said finger is a live or dead one by examining a correlation between said areal information and color information and by referring to a predetermined threshold and a coefficient of correlation with the fingerprint area calculated for each of predetermined colors.

7. The fingerprint image input device according to claim 6, wherein said areal information extraction unit extracts the areal information of said fingerprint by a calculation extracting fingerprint ridges and valleys from said fingerprint image data and a calculation calculating an area of said ridge and valley regions of the fingerprint.

8. The fingerprint image input device according to claim 7, wherein said color information extraction unit conducts a calculation for selecting a specific area of said fingerprint, for example, a central area of said fingerprint and a calculation for calculating an average of each of red (R), green (G) and blue (B) in said specific area.

9. The fingerprint image input device according to claim 6, wherein said color information extraction unit conducts a calculation for selecting a specific area of said fingerprint, for example, a central area of said fingerprint and a calculation for calculating an average of each of red (R), green (G) and blue (B) in said specific area.

10. A fingerprint-based living body identification method comprising the steps of:
- acquiring a color fingerprint image data of a finger in close contact with an image input surface;
- storing said fingerprint image data in a temporary memory;
- extracting an areal information of said fingerprint from said fingerprint image data;
- extracting a color information of said fingerprint; and
- determining whether said finger is a live or dead one by examining a correlation between said areal information and said color information and by referring to a predetermined threshold and a coefficient of correlation with the fingerprint area calculated for each of predetermined colors.

11. The fingerprint-based living body identification method according to claim 10, wherein said extracting of said areal information extracts the areal information of said fingerprint by a calculation extracting fingerprint ridges and valleys from said fingerprint image data and a calculation calculating an area of said ridge and valley regions of the fingerprint.

12. The fingerprint-based living body identification method according to claim 11, wherein said extracting of said color information conducts a calculation for selecting a specific area of said fingerprint, for example, a central area of said fingerprint and a calculation for calculating an average of each of red (R), green (G) and blue (B) in said specific area.

13. The fingerprint-based living body identification method according to claim 10, wherein said extracting of said color information conducts a calculation for selecting a specific area of said fingerprint, for example, a central area of said fingerprint and a calculation for calculating an average of each of red (R), green (G) and blue (B) in said specific area.

* * * * *